Jan. 22, 1957 L. P. FRIEDER ET AL 2,778,761
LAMINATED PLASTIC ASSEMBLY
Filed Jan. 9, 1952 3 Sheets-Sheet 1

INVENTORS
LEONARD P. FRIEDER
WALTER S. FINKEN
BY
ATTORNEY

Jan. 22, 1957 L. P. FRIEDER ET AL 2,778,761
LAMINATED PLASTIC ASSEMBLY
Filed Jan. 9, 1952 3 Sheets-Sheet 2
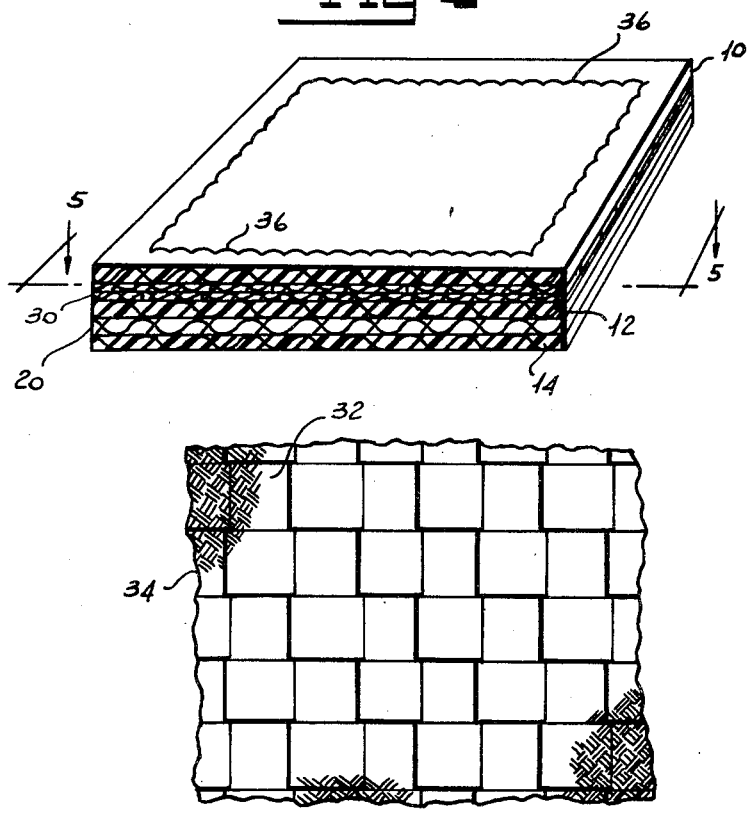
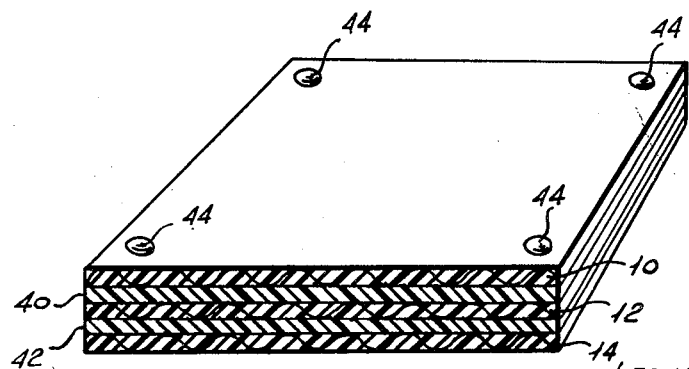
INVENTORS
LEONARD P. FRIEDER
WALTER S. FINKEN
BY
ATTORNEY Jan. 22, 1957  L. P. FRIEDER ET AL  2,778,761
LAMINATED PLASTIC ASSEMBLY
Filed Jan. 9, 1952  3 Sheets-Sheet 3

INVENTORS
LEONARD P. FRIEDER
WALTER S. FINKEN
BY
*Harry L. Shavier*
ATTORNEY

United States Patent Office 2,778,761
Patented Jan. 22, 1957

2,778,761
LAMINATED PLASTIC ASSEMBLY

Leonard P. Frieder, Great Neck, and Walter S. Finken, Brooklyn, N. Y.; said Finken assignor to said Frieder Application January 9, 1952, Serial No. 265,598

5 Claims. (Cl. 154—52.5)

Our invention relates to a laminated plastic assembly and more particularly to a laminated assembly which is resistant to penetration.

Steel helmets for the protection of the infantry troops and the like have reduced head wounds to a minimum. Steel helmets, however, have the disadvantage of being heavy and of being good conductors of heat. As a result, helmets made of steel are uncomfortable when worn for long periods of time and afford reduced comfort during cold weather conditions.

Helmets made of laminated plastics are known to the art. These are employed as crash helmets to be worn by aviators and are designed principally for shock absorption. The plastic helmets of the prior art are usually formed of a fabric such as one woven of glass fibers impregnated with a suitable plastic composition. The quality of shock absorption necessitates the quality of tensile strength, of elongation and of control over elastic limit for a minimum weight. Helmets adapted to resist penetration, however, do not require the qualities necessitated by helmets designed for shock absorption but may be of lower tensile strength and have reduced qualities governing high elongation.

One object of our invention is to provide a laminated plastic assembly which may be used for manufacturing helmets, body armor, pilot seats and the like, where it is desired to present an area having a resistance to penetration to protect personnel from flying fragments and reduce the force of a bullet to the point where it will not be lethal.

Another object of our invention is to provide a laminated plastic assembly which has both features of high shock absorption and resistance to penetration.

Other and further objects of our invention will appear from the following description.

In general, our invention contemplates the provision of a pair of hard layers formed by impregnating a fabric woven of glass fibers or the like with a suitable plastic. If desired, a layer of softer material may be positioned between the hard laminates. The soft intermediate material may be unimpregnated fiber glass, mats made of fiber glass, or the like. The layers are bonded to each other at predetermined points to permit deformation of the successive layers. The hard layers are very shock-resistant and the assembly is such that it is extremely resistant to penetration.

Our invention may take many forms. In the accompanying drawings, which form part of the instant specification and which are to be read in conjunction therewith and in which like reference numerals are used to indicate like parts in the various views:

Figure 4 is a view similar to Figure 3 in which the layers are bonded to each other by sewing with nylon thread or the like or by means of wire staples and in which one of the hard layers is formed of woven plastic-impregnated tapes or the like.

Figure 5 is a fragmentary view drawn on an enlarged scale viewed along the line 5—5 of Figure 4.

Figure 6 is a view similar to Figure 4 in which the intermediate layers of material of less hardness are formed of colophony and in which the layers are secured to each other by means of nuts and bolts.

At the outset, it should be borne in mind that our assembly is not intended to be bullet-proof, but rather, resistant to flying fragments and other missiles of comparatively low velocity. Our assembly, however, will retard high velocity missiles, as will be pointed out hereinafter more fully, and thus reduce the lethal effect of these.

Figure 1:
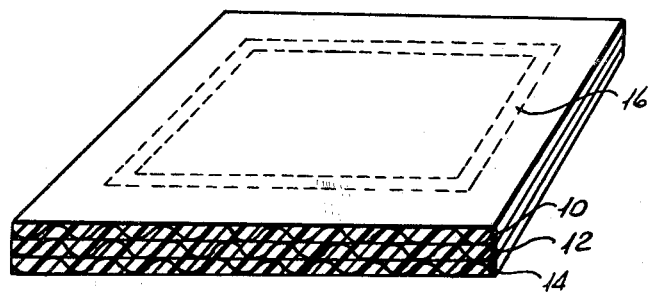
Figure 1 is a perspective view of a laminated plastic assembly showing one embodiment of our invention in which a plurality of hard laminates are bonded to each other only adjacent their perimeter.

More particularly referring now to Figure 1, a laminated plastic assembly is formed of three layers 10, 12 and 14. Each of the layers may be composed of fiber glass in woven, braided or matted form, impregnated with a resinous material such as a polyester resin. Any suitable thermoplastic or thermosetting plastic may be employed, such as a polyethylene plastic, an allyl plastic, a polystyrene plastic, phenol formaldehyde compounds, urea formaldehyde, or the like. We prefer to use the polyesters. In making the assembly shown in Figure 1, each of the laminates may be separately formed and then bonded only adjacent the periphery of the assembly, as indicated by the dotted area 16. The layers may be bonded to each other by a thin layer of a plastic material. Each layer, it will be observed, is separate from an adjacent layer, except along the area 16. The shearing effect from the force of the missile upon the first layer is broken by the lack of bond between adjacent layers permitting each layer to deflect through different radii of curvature. This can best be seen by reference to Figure 7, in which the uppermost layer has the sharpest curvature. The second layer has a lesser curvature and the deflection extends over a wider area. Each succeeding layer unbonded to the layer above will have a larger radius of curvature and distribute the force over successively larger areas. It is this phenomenon which gives us the desired resistant effect.

Figure 2:
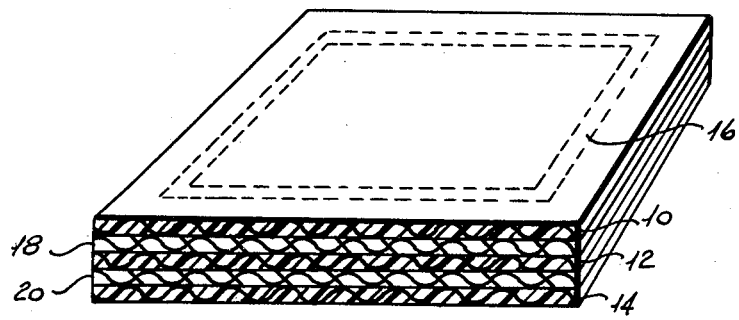
Figure 2 is a view similar to Figure 1 of an assembly comprising three hard laminates with intermediate soft fills bonded to each other only adjacent their periphery.

In the form of our invention shown in Figure 2, laminates 10, 12 and 14 are separated by fill layers 18 and 20, which are materials of lesser hardness than laminates 10, 12 and 14. This assembly provides a greater retarding effect since each laminate may deflect to a larger extent before permitting the missile to pierce the laminate. In this manner we are enabled to employ the tensile strength of each laminate and reduce the shearing effect which would otherwise exist. The force of the missile is slackened in proportion to the deflecting reaction of the successive laminates. Due to the fact that the deflection of each succeeding laminate is not uniform, a successively greater contact area is presented to the missile, thus decreasing its penetrative force. The layers 18 and 20, of lesser hardness, may be unimpregnated cloth woven of glass fibers or may be a braid or a mat of this material. If desired, a softer plastic formed by including a plasticizer in a plastic may be used to impregnate the layers of lesser hardness. The layers are not bonded to each other except adjacent their periphery along the area 16.

Figure 3:
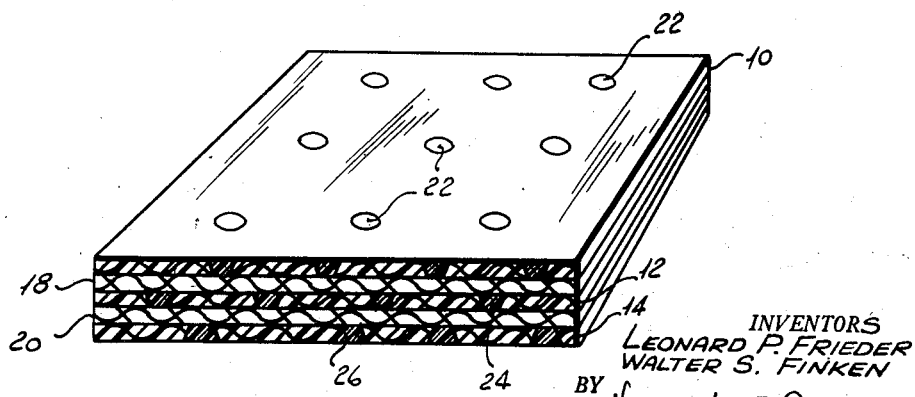
Figure 3 is a view similar to Figure 2 in which the layers are bonded to each other at separated points.

Referring now to Figure 3, the laminates 10, 12 and 14 are assembled with intermediate layers 18 and 20 as in the form shown in Figure 2. The laminate 10 is provided with a plurality of spaced openings 22; the laminate 12 is provided with a series of spaced openings 24; and the laminate 14 is provided with a series of spaced openings 26. The openings are tapered, as can readily be seen by reference to Figure 3, to provide a keying effect. The openings during the formation of the assembly will become filled with excess plastic. In this manner the laminate 10 is bonded to the fill 18 by tapered plastic plugs. The laminate 12 is bonded to the layers 18 and 20 by the plastic plugs which form in the openings 24, and the laminate 14 is bonded to the fill layer 20 by the plastic plugs which form in the openings 26. This form of construction can be used for much larger areas and is especially useful with the employment of a thermosetting plastic. The layers may be assembled as shown in Figure 3, placed in a mold and molded to any desired form with heat and pressure. Each layer is bonded to the other layer at separated points in order to permit nonuniform deflection of successive layers.

Referring now to Figure 4, the upper laminate 10, the intermediate laminate 12 and the bottom laminate 14 are of the same type as those shown in Figure 2. The intermediate laminate 20 is similar to the laminate of less hardness employed in Figure 2. Between the laminate 10 and the laminate 12, however, we interpose a woven layer 30 formed of braids 32 and 34 interlaced at right angles to each other, as can readily be seen by reference to Figure 5. The braids may be impregnated with a polyester resin which may have a plasticizer, depending upon whether or not the layer 30 is to be a hard or a softer layer. It will be observed that the interlaced braids are not secured to each other except by the interlacing occasioned by the weaving. Thus, each portion of the braid is free to move with respect to the contacting portion of the adjacent braid. In other words, the interlaced braids permit nonuniform flexing of adjacent layers, which is a salient feature of the instant invention. In Figure 4, instead of securing the laminates to each other by means of a plastic adjacent their periphery we sew the laminates together by means of stitches 36 of nylon. The form of the invention shown in Figure 4 has more weight than the other forms but presents increased resistance to penetration.

In Figure 6 still another form of our invention is shown. Here, the laminates 10, 12 and 14 are similar to the three laminates used in all the other forms of the invention. The layers 40 and 42, however, are formed of colophony, which is a common pine rosin obtainable in any grade and has melting points ranging between 212° F. and 302° F., depending upon the grade selected. The colophony has suspended therein abrasive substances such as broken glass, emery, or the like, for a purpose which will be pointed out more fully hereinafter. In the form of the invention shown in Figure 6 the laminates are secured to each other mechanically by rivets 44 positioned at separated points.

Figure 7:
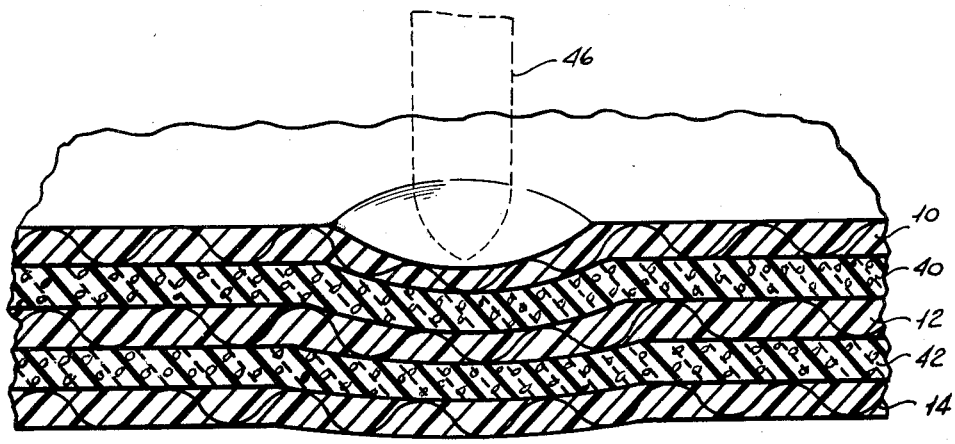
Figure 7 is a fragmentary view drawn on an enlarged scale showing the position of the layers in the form shown in Figure 6 at the moment of impact of a projectile.

Figure 7 is a diagrammatic sectional view showing the conformation which the laminates assume at the moment of impact of a projectile 46. The upper laminate 10 is deflected in a comparatively sharp curve. The layer 40 assumes a curve having a greater radius. The laminate 12 is deflected through a still greater radius. The laminate 42 is deflected through a larger radius than the laminate 12, while the bottom laminate 14 is deflected through the largest radius. It will be observed that each successive laminate is deflected over a successively larger area.

It is well known that a liquid is an excellent retardant for projectiles of all types. It is not practical to confine water or molten metal or other liquids between the laminates. The kinetic energy of the missile in being stopped or slowed down is converted into heat. An armor-piercing projectile, for example, in going through a piece of armor plate, is raised to a white heat. This conversion is extremely rapid, and, due to the comparatively low rate of heat conduction, generally local. Our construction is such that the colophony will become molten under the impact of the projectile and further retard its penetration. Upon impact, the comparatively brittle colophony will shatter and melt almost instantaneously and create a highly viscous hydraulic head under the confinement of the remainder of the layer and the adjacent laminates. In order to destroy any lubricating effect which the molten rosin may possibly create if squeezed past the projectile, we disseminate ground glass, emery, or similar abrasive substances, through the rosin. In this manner a multitude of hard surfaces are imbedded in the rosin to destroy any possible lubricating effect.

Figure 8:
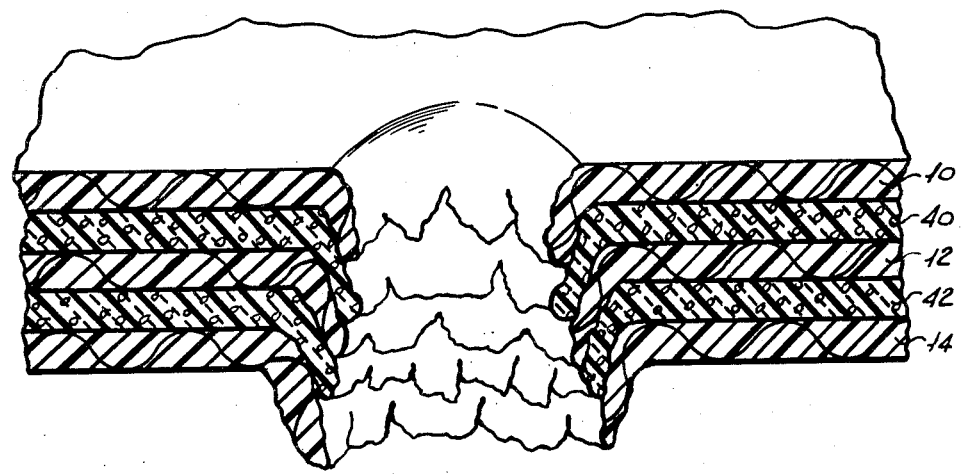
Figure 8 is a view similar to Figure 7 showing the effect of a missile passing through the resistant laminated plastic assembly.

In Figure 8 we have shown the type of opening produced by a high-velocity bullet passing through our resistant laminated assembly. It will be noted that the opening diverges in the direction of the slide of the projectile so that increased resistance is met with each succeeding penetration.

The form of the invention shown in Figure 6 can be assembled by pumping liquefied impregnated rosin between laminates and then permitting it to harden. In order to preclude the adherence of the rosin to the confining laminates the adjacent surfaces of laminate may be covered with stearic acid, glycerides of fatty acids, or the like.

It is to be understood that while we prefer to use glass fibers to form the fabric which is impregnated with the resin, any other fabric may be used, such as nylon, or the like. The thickness of the laminates may vary, depending on their use. To produce a bullet-retarding helmet weighing approximately twenty-four ounces, each of the laminations was $\frac{1}{32}$ of an inch thick.

In a test which we made with three layers of hard laminates such as shown in Figure 1, each of which was $\frac{3}{32}$ of an inch in thickness, a steel-clad projectile fired at fifteen feet from a high-velocity police revolver of .38-caliber barely penetrated the assembly despite the high-velocity impact.

It is to be understood that our laminated plastic assembly can be used not only for helmets, body armor, seats for fighter pilots, lightweight armor for vehicles, landing craft, or the like, but may be employed for other structures requiring shock resistance, such as cargo drop containers, landing mats, automobile fenders, automobile bodies, and the like. Our plastic assembly can be rolled to form tubes or formed into other structural shapes.

It will be seen that we have accomplished the objects of our invention. We have provided a laminated plastic assembly useful in the manufacture of helmets, body armor, pilot seats and the like, which presents resistance to penetration in order to protect personnel from flying fragments and reduce the force of higher velocity projectiles. We have provided a laminated plastic assembly which has not only high shock absorption but also resistance to penetration.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A relatively rigid missile-retarding assembly including in combination a stack of a plurality of sheets of fibrous material each uniformly impregnated with a synthetic resin and having their adjacent surfaces bonded to each other by means of a synthetic resin, said bond being discontinuous in all directions, the aggregate area through which the sheets are so secured being small with respect to the remainder of the surface area of the sheets, which remainder area is free of securing means to permit the sheets to deflect differentially with respect to one another under the impact of a missile.

2. A missile-retarding assembly as in claim 1 in which said fibrous material is composed of glass filaments.

3. An assembly as in claim 1 in which said means forming a bond comprises a plurality of separated plugs of synthetic resin.

4. An assembly as in claim 1 in which alternate layers of the stack are differently impregnated with synthetic resin whereby to produce alternate relatively hard and soft layers.

5. An assembly as in claim 1 in which said synthetic resin is a polyester resin.

References Cited in the file of this patent

UNITED STATES PATENTS

| | | |
|---|---|---|
| 663,961 | Donaldson | Dec. 18, 1900 |
| 1,203,916 | Schwarz | Nov. 7, 1916 |
| 1,213,118 | Lynch | Jan. 16, 1917 |
| 1,861,663 | Lahey | June 7, 1932 |
| 2,366,274 | Luth et al. | Jan. 2, 1945 |
| 2,399,184 | Heckert | Apr. 30, 1946 |
| 2,466,597 | Kropscott et al. | Apr. 5, 1949 |
| 2,562,951 | Rose et al. | Aug. 7, 1951 |
| 2,608,502 | Merriman | Aug. 26, 1952 |
| 2,616,482 | Barnes | Nov. 4, 1952 |
| 2,697,054 | Dietz et al. | Dec. 14, 1954 |

FOREIGN PATENTS

| | | |
|---|---|---|
| 396,405 | Great Britain | Aug. 2, 1933 |
| 496,838 | Great Britain | Dec. 7, 1938 |